(12) United States Patent
Rainer et al.

(10) Patent No.: US 10,651,731 B1
(45) Date of Patent: May 12, 2020

(54) ZERO VOLTAGE SWITCHING OF INTERLEAVED SWITCHED-CAPACITOR CONVERTERS

(71) Applicant: INFINEON TECHNOLOGIES AUSTRIA AG, Villach (AT)

(72) Inventors: Christian S. Rainer, Klagenfurt (AT); Matthew A. Hunter, Torrance, CA (US)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 16/263,479

(22) Filed: Jan. 31, 2019

(51) Int. Cl.
*H02M 3/07* (2006.01)
*H02M 7/483* (2007.01)
*H02M 3/158* (2006.01)

(52) U.S. Cl.
CPC .......... *H02M 3/07* (2013.01); *H02M 3/1588* (2013.01)

(58) Field of Classification Search
CPC .. H02M 3/07; H02M 3/073; H02M 2003/077; H02M 2007/4835; H02M 3/158; H02M 3/1588; H02M 3/1584
See application file for complete search history.

(56) References Cited

U.S. PATENT DOCUMENTS

| 9,318,974 | B2 * | 4/2016 | Yoscovich | H02M 1/08 |
| 9,831,776 | B1 * | 11/2017 | Jiang | H02M 3/158 |
| 9,917,517 | B1 * | 3/2018 | Jiang | H02M 1/14 |
| 10,224,803 | B1 * | 3/2019 | Rainer | H02M 1/083 |
| 10,256,729 | B1 * | 4/2019 | Notsch | H02M 1/14 |
| 2010/0019753 | A1 * | 1/2010 | Ikeda | H02M 3/158 323/311 |
| 2013/0163302 | A1 * | 6/2013 | Li | H02M 3/158 363/127 |
| 2015/0349649 | A1 * | 12/2015 | Zane | H02M 3/33507 363/21.03 |
| 2016/0344287 | A1 * | 11/2016 | Stauth | H02M 3/07 |
| 2016/0352218 | A1 * | 12/2016 | Stauth | H02M 1/08 |
| 2017/0201177 | A1 * | 7/2017 | Kesarwani | H02M 3/158 |

* cited by examiner

*Primary Examiner* — Adolf D Berhane
*Assistant Examiner* — Sisay G Tiku
(74) *Attorney, Agent, or Firm* — Armis IP Law, LLC

(57) ABSTRACT

A power supply system comprises: multiple switched-capacitor converters and a controller. The multiple switched-capacitor converters include at least a first switched-capacitor converter interleaved with a second switched-capacitor converter. During operation, the controller produces control signals. The control signals control the interleaved first switched-capacitor converter and the second switched-capacitor converter to produce an output voltage to power a load.

31 Claims, 12 Drawing Sheets

ZERO VOLTAGE SWITCHING OF INTERLEAVED SWITCHED-CAPACITOR CONVERTERS

BACKGROUND

As its name suggests, a conventional switched-capacitor DC-DC converter converts a received DC input voltage into a DC output voltage.

In one conventional application of such technology, the input voltage to the conventional switched-capacitor converter falls in a range between 40 VDC to 60 VDC. In such an instance, switches in the switched-capacitor converter are controlled to transfer charge stored in capacitors, resulting in conversion of the input voltage such as a 48 VDC to an output voltage such as 12 VDC for a so-called 4:1 switched-capacitor converter. In other words, a conventional switched-capacitor converter can be configured to convert a 48 VDC voltage into a 12 VDC voltage.

To avoid so-called hard switching in the switched-capacitor converter, the switches in the switched-capacitor converter are preferably switched when there is near zero voltage across them and near zero current flowing through them.

The undesirable hard switching in a conventional switched-capacitor converter may be mitigated by placing an individual inductor in series with a respective capacitor in each stage of the switched-capacitor converter. This results in a resonant (or semi-resonant) switching converter. Such a switched-capacitor converter is sometimes termed a switched tank converter (STC). The resonant tank circuit formed by a series connection of an inductor and capacitor has an associated resonant frequency that is based upon the inductance and capacitance of these components.

Switching of the switches in the conventional switched-capacitor converter at the respective resonant frequency results in so-called zero current switching (ZCS), which reduces switching losses and provides reasonably good power conversion efficiency.

BRIEF DESCRIPTION

This disclosure further includes the observation that power conversion efficiency of conventional switched-capacitor converters can be improved as described herein. To this end, embodiments herein include novel ways of providing more efficient power conversion using multiple switched-capacitor converters (such as uniquely in parallel) to power a load.

More specifically, in contrast to conventional techniques, embodiments herein include operating any number of multiple switched-capacitor converters out of phase with respect to each other. In one embodiment, each converter is sized to supply an appropriate portion of power to a load. Because the input power consumption is out of phase (i.e., the ON times are not aligned), the peak demand and corresponding stress on the power supply is significantly reduced.

In accordance with more specific embodiments, an apparatus (such as a power supply) comprises: multiple switched-capacitor converters and a controller. The multiple switched-capacitor converters include at least a first switched-capacitor converter and a second switched-capacitor converter. In one embodiment, each of the multiple switched-capacitor converters are interleaved such that the first switched-capacitor converter is interleaved with the second switched-capacitor converter. During operation, such as generation of an output voltage to power a load, the controller produces control signals that control the interleaved first switched-capacitor converter and the second switched-capacitor converter to produce the output voltage.

In accordance with further embodiments, the controller is further operable to switch between activating each of the switched-capacitor converters (such as the first switched-capacitor converter and the second switched-capacitor converter) during a switched-capacitor switching cycle to produce the output voltage. For example, in one embodiment, the controller produces multiple control signals such as at least a first control signal and a second control signal. The first control signal controls activation of the first switched-capacitor converter in the interleaved switched-capacitor converter. The second control signal controls activation of the second switched-capacitor converter in the interleaved switched-capacitor converter.

In accordance with further embodiments, the second control signal is phase delayed with respect to the first control signal such that: i) during a first mode or phase, the first switched-capacitor converter is connected between a first voltage source (providing a first reference voltage source such as Vin) and an output node that produces the output voltage when the second switched-capacitor converter is coupled between a second voltage source (providing a second reference voltage such as ground) and the output node, and ii) during a second mode or phase, the first switched-capacitor converter is connected between the second voltage source (providing the second first reference voltage source such as ground) and the output node when the second switched-capacitor converter is coupled between the first voltage source (providing the input voltage) and the output node that produces the output voltage.

Further embodiments of the power converter as described herein include an inductor operable to provide zero voltage switching (ZVS) to both first switches in the first switched-capacitor converter and second switches in the second switched-capacitor converter during switch transition such as a dead-time in which the first switches and the second switches are deactivated to an OFF state. In general, zero voltage switching means that the voltage across the switches in the interleaved switched-capacitor converter are zero during state transitions.

In accordance with still further embodiments, the power converter as described herein includes a first resonant circuit path; the first resonant circuit path disposed in the first switched-capacitor converter. The power converter further includes: a second resonant circuit path; the second resonant circuit path disposed in the second switched-capacitor converter. In one embodiment, a resonant frequency of the first resonant circuit path is substantially similar (such as within 10% of point) with respective to a resonant frequency of the second resonant circuit path. Although, in accordance with further embodiments, the resonant frequency of each can be any suitable value.

Further embodiments of the switched-capacitor converter as described herein include an inductor electrically coupled to both the first resonant circuit path and the second resonant circuit path. For example, in one embodiment, the first resonant circuit path is coupled to a first node of the inductor; the second resonant circuit path is coupled to a second node of the resonant circuit path. During operation of the interleaved switched-capacitor converter, the inductor provides zero voltage switching to first switches in the first switched-capacitor converter and second switches in the second switched-capacitor converter.

In accordance with further embodiments, the interleaved first switched-capacitor converter and the second switched-capacitor converter convert a received input voltage into an output voltage that powers a load in accordance with a ratio of X:1, in which X=Vin/Vout, where Vin=a magnitude of the input voltage and Vout=a magnitude of the output voltage; and wherein X is an integer multiple of 2.

In accordance with further embodiments, the first switched-capacitor converter of the interleaved switched-capacitor converter includes a first set of multiple resonant circuit paths; the second switched-capacitor converter of the interleaved switched-capacitor converter includes a second set of multiple resonant circuit paths. The controller switches between activating the first set of multiple resonant circuit paths and the second set of resonant circuit paths to produce the output voltage.

In further embodiments, the resonant circuit path in the first switched-capacitor converter includes a first flying capacitor, switching of which contributes to generation of the output voltage; the resonant circuit path in the second switched-capacitor converter includes a second flying capacitor, switching of which contributes to generation of the output voltage as well. In one embodiment, inclusion of one or more flying capacitors in respective one or more resonant circuit paths of the interleaved switched-capacitor converter enables higher conversion Vin to Vout ratios (output voltages having smaller magnitudes relative to a magnitude of an input voltage).

As previously discussed, the interleaved switched-capacitor converter can be configured to include multiple switched-capacitor converters. In one embodiment, by way of non-limiting example, the interleaved switched-capacitor converter includes a number, N, of switched-capacitor converters including the first switched-capacitor converter and the second switched-capacitor converter, where N is an integer greater than 1, and wherein the controller is operable to produce N control signals, each of which controls a respective one of the N switched-capacitor converters. In accordance with further embodiments, each of the N control signals is phase shifted by 360/N degrees.

Embodiments herein are useful over conventional techniques. For example, in contrast to conventional techniques, the novel power supply including multiple interleaved switched-capacitor converters provides higher efficiency of converting an input voltage to a respective output voltage. That is, embodiments herein provide improved efficiency (lower loss of energy) of generating a respective output voltage.

These and other more specific embodiments are disclosed in more detail below.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switched-capacitor converters, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
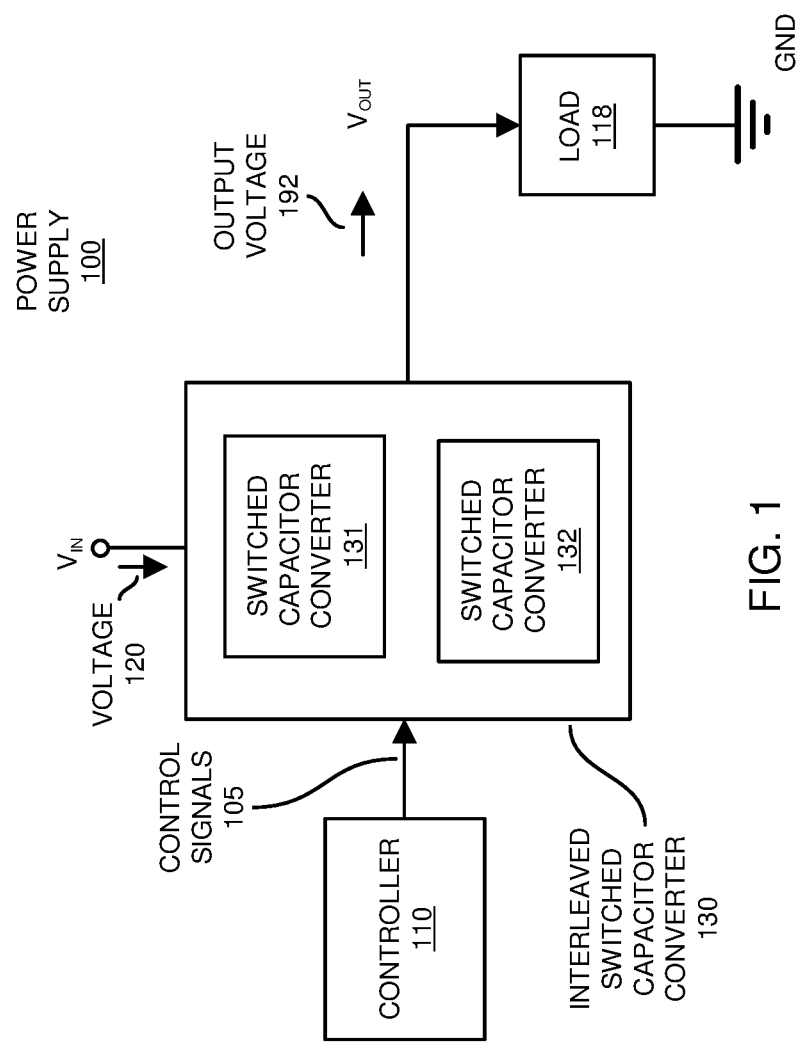
FIG. 1 is an example general diagram illustrating an interleaved switched-capacitor converter according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, as further discussed herein, a power supply (converter) comprises: multiple switched-capacitor converters and a controller. The multiple switched-capacitor converters include at least a first switched-capacitor converter interleaved with a second switched-capacitor converter. During operation, the controller produces control signals. The control signals control the multiple switched-capacitor converters such as at least the interleaved first switched-capacitor converter and the second switched-capacitor converter to produce an output voltage to power a load.

The power supply as described herein provides higher efficiency conversion of an input voltage to an output voltage that powers a load.

Now, more specifically, FIG. 1 is an example diagram illustrating a power supply including an interleaved switched-capacitor converter according to embodiments herein.

As shown in this example embodiment, power supply 100 (such as an apparatus, electronic device, etc.) includes a controller 110 and an interleaved switched-capacitor converter 150. Interleaved switched-capacitor converter 130 includes at least switched-capacitor converter 131 and switched-capacitor converter 132.

Depending on the embodiment, the interleaved switched-capacitor converter 130 can include any number of switched-capacitor converters.

Note that each of the resources as described herein can be instantiated in any suitable manner. For example, each of the controller 110, interleaved switched-capacitor converter 130, etc., can be instantiated as or include hardware (such as circuitry), software (executed instructions), or a combination of hardware and executed software resources.

During operation, controller 110 produces control signals 105 (such as one or more pulse width modulation signals) that control states of respective control switches in switched-capacitor converter 150.

As further shown in this example embodiment, the interleaved switched-capacitor converter 130 receives the input voltage 120 (Vin, such as a voltage including AC and/or DC voltage components) and converts it into the output voltage 192 (such as Vout, including AC and/or DC voltage components) that powers the load 118.

Figure 2:
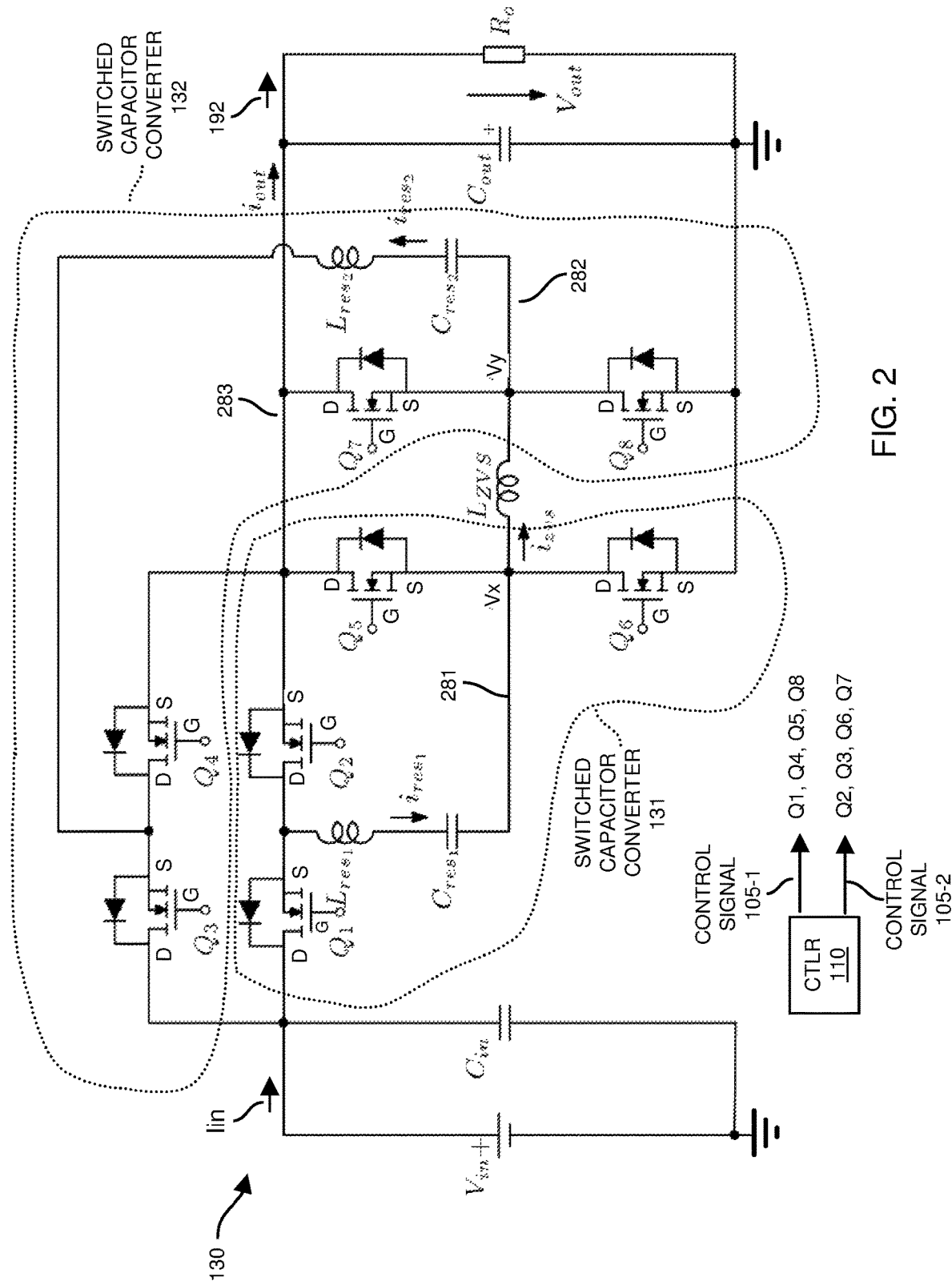
FIG. 2 is an example detailed diagram illustrating an interleaved switched-capacitor converter according to embodiments herein.

FIG. 2 is an example diagram illustrating a switched-capacitor converter according to embodiments herein.

As shown, the example interleaved switched-capacitor converter 130 includes switched-capacitor converter 131 and switched-capacitor converter 132.

Switched-capacitor converter 131 (apparatus such as hardware, circuitry, logic, executed software instructions, etc., depending on the embodiment) includes a combination of switch Q1, switch Q2, switch Q5, switch Q6, inductor Lres1, and capacitor Cres1.

Switched-capacitor converter 132 (apparatus such as hardware, circuitry, executed instructions, logic, etc., depending on the embodiment) includes switch Q3, switch Q4, switch Q7, switch Q8, inductor Lres2, and capacitor Cres2.

Note that each of the switches as described herein can be any suitable type of switch devices such as (Metal Oxide Semiconductor) field effect transistors, bipolar junction transistors, etc.

As further shown, the interleaved switched-capacitor converter 130 includes inductor Lzvs, respective axial ends of which couples the first switched-capacitor converter 131 to the second switched-capacitor converter 132 at nodes 281 and 282.

Connectivity in the switched-capacitor converter 131 further includes: input voltage source (Vin) coupled to the drain node (D) of switch Q1; the source node (S) of switch Q1 coupled to the drain node (D) of switch Q2 as well as a respective node of the inductor Lres1; the source node (S) of switch Q2 connected to a combination of the drain node (D) of switch Q5, the drain node (D) of switch Q7, a respective node of the output capacitor Cout, and load 118; inductor Lres1 is connected in series with capacitor Cres1, which itself (capacitor Cres1) is coupled to node 281. The drain node (D) of switch Q6 is coupled between the node 281 and the source node (S) of the switch Q6 is connected a reference voltage such as ground (GND).

Further, connectivity in the switched-capacitor converter 132 includes: input voltage source (Vin) coupled to the drain node (D) of switch Q3; the source node (S) of switch Q3 coupled to the drain node (D) of switch Q4 as well as a respective node of the inductor Lres2; the source node (S) of switch Q4 connected to (node 283) and a combination of the source node (S) of switch Q2, the drain node (D) of switch Q5, the drain node (D) of switch Q7, a respective node of the output capacitor Cout, and load 118. Inductor Lres2 is connected in series with capacitor Cres2, which itself (capacitor Cres2) is coupled to node 282. The drain node (D) of switch Q8 is coupled to the node 282 and the source node (S) of switch Q8 is connected to the ground reference (GND); the drain node (D) of switch Q7 is connected to node 283; the source node (S) of switch Q7 is connected to node 282.

Further in this example embodiment, the controller 110 control produces signal 105-1 and 105-2.

During operation, such as switching of the interleaved switched-capacitor converter 130, the control signal 105-1 drives multiple switches including the gate (G) of switch Q1, the gate (G) of switch Q4, the gate (G) of switch Q5, and the gate (G) of Q8.

The control signal 105-2 drives multiple switches including the gate (G) of switch Q2, the gate (G) of switch Q3, the gate (G) of switch Q6, and the gate (G) of switch Q7.

The magnitude of the input voltage Vin can be any suitable value. The magnitude of the output voltage 192 can be any suitable value.

In one embodiment, the interleaved switched-capacitor converter 130 is a 2:1 converter. For example, the magnitude of the output voltage 192 is Vin/2. Thus, if Vin=48 VDC, the magnitude of the output voltage 123 is 24 volts; if Vin=24 VDC, the magnitude of the output voltage 123 is 12 volts; and so on.

The settings of capacitor Cres1 and inductor Lres1 as well as settings of capacitor Cres2 and inductor Lres2 can be any suitable value. For example, the voltage converter as described herein provides better performance when Lres1=Lres2 and Cres1=Cres2, but works well even if Lres1 Lres2 and Cres1 Cres2.

In one embodiment, the inductance of inductor Lres1 is substantially similar (such as within 10% of point) to the inductance of Lres2. In one embodiment, the capacitance of capacitor Cres1 is substantially similar (such as within 10% of point) of the capacitance of Cres2. Thus, in one embodiment, a resonant frequency of the first resonant circuit path (combination of capacitor Cres1 and inductor Lres1) is substantially similar to a resonant frequency of the second resonant circuit path (combination of capacitor Cres2 and inductor Lres2). Although, the resonant frequency of each resonant circuit path can be any suitable value.

The switched-capacitor converter 131 includes a first resonant circuit path such as a series combination of inductor Lres1 and capacitor Cres1 in series. The resonant frequency of the switched-capacitor converter 131 is:

$$f_{res1} = \frac{1}{2\pi\sqrt{(C_{res1})L_{res1}}}$$

The switched-capacitor converter 132 includes a second resonant circuit path such as a series combination of inductor Lres2 and capacitor Cres2 in series. The resonant frequency of the switched-capacitor converter 132 is:

$$f_{res2} = \frac{1}{2\pi\sqrt{(C_{res2})L_{res2}}}$$

In one embodiment, the resonant frequency $f_{res1}$ is substantially equal to (such as within 10% of point) the resonant frequency $f_{res2}$. However, as previously discussed, the resonant frequency of each resonant circuit path can be any suitable value.

Figure 4:
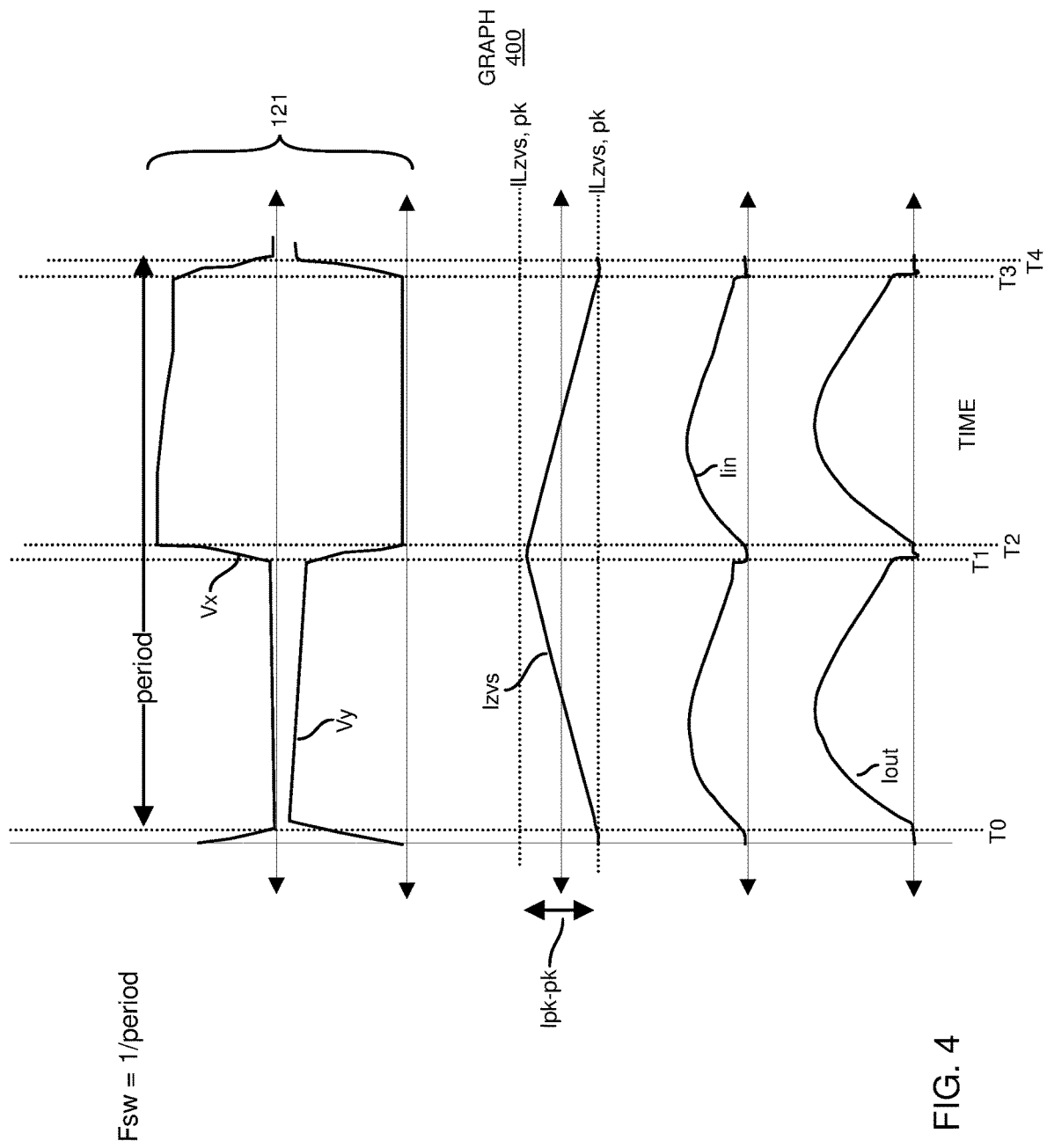
FIG. 4 is an example timing diagram illustrating timing of input and output signals associated with an interleaved switched-capacitor converter according to embodiments herein.

The inductor Lzvs can be any suitable value as well. See the discussion below in FIG. 4 illustrating an example setting of inductor Lzvs to provide zero voltage switching to switches in the power supply 100.

Figure 6:
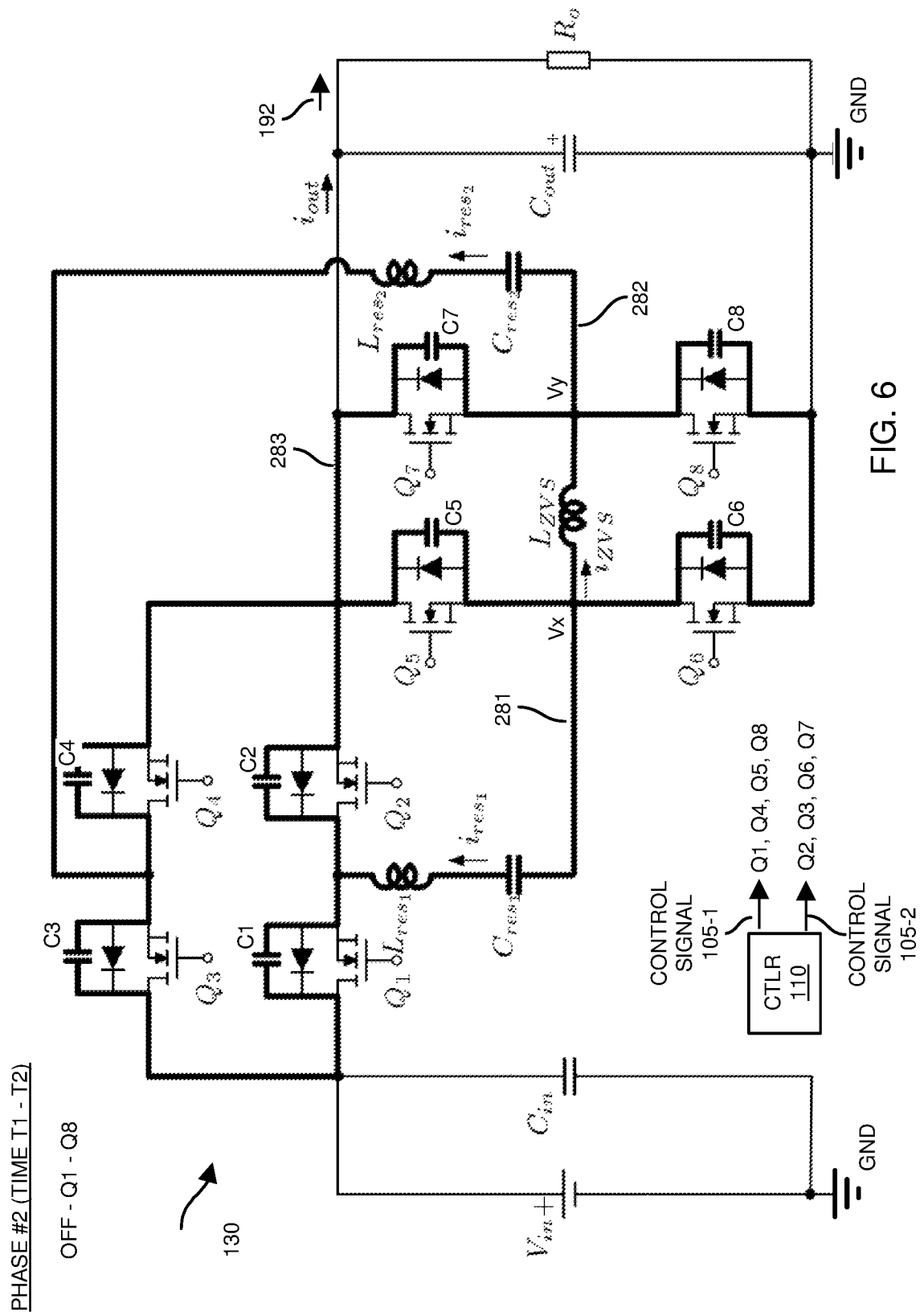
FIG. 6 is an example diagram illustrating a dead time or deactivation of switches in an interleaved switched-capacitor converter according to embodiments herein.
Figure 8:
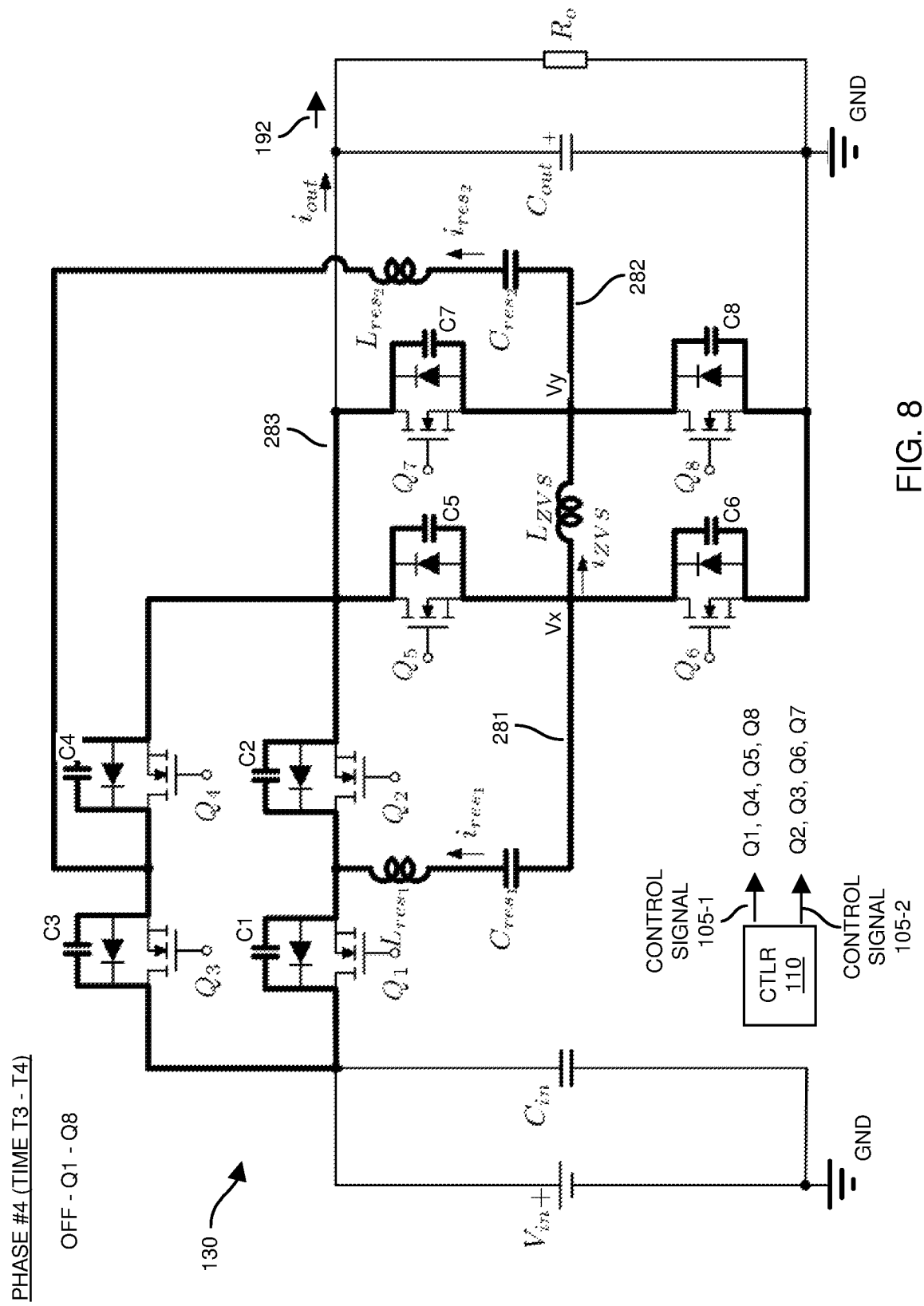
FIG. 8 is an example diagram illustrating a dead time or deactivation of switches in a power supply according to embodiments herein.

In one example embodiment, Lzvs=1.2 microHenries+/−20%; Fsw=610 KiloHertz. Embodiments herein include ensuring that an amount of energy stored in the resonant inductor (Lzvs) is greater than the energy stored in the MOSFET output capacitors (inherent capacitors across transistors Q1-Q8, as shown in FIGS. 6 and 8). In one embodiment:

Ipk–pk=(VLzvs_min/Lzvs_max)×deltaT=(10 V/1.44 microHenries)×(1/Fsw)×0.5=5.69 Amps ELzvs=0.5Lzvs(Ipk–pk/2)$^2$=0.5×1.2 microHenries× (11.66 A)$^2$=5.83 micro Joules; where ELzvs=the energy stored in the inductor Lzvs;

$E_{LZVS}$>$E_{COSS\_MAX}$, where $E_{COSS\_MAX}$=the energy stored in inherent capacitors of switches=5.2 microJoules;

5.83 microJoules>5.2 microJoules

Accordingly, embodiments herein include an inductor Lzvs operable to provide zero voltage switching to first switches (such as switches Q1, Q2, Q5, and Q6) in the first switched-capacitor converter 131 and second switches (such as switches Q3, Q4, Q7, and Q8) in the second switched-capacitor converter 132 during a transition to a dead-time in which the first switches and the second switches are deactivated to an OFF state.

Note that the power supply as described herein can include any number of phases. In one embodiment, assuming two interleaved switched-capacitor converters 131 and 132, the pulse width modulation of control signals 105 is approximately 50% duty cycle, although this can vary depending on the number of phases.

For example, the interleaved switched-capacitor converter 130 can be configured to include, N, switched-capacitor converters (such as including at least the first switched-capacitor converter 131 and the second switched-capacitor converter 132). In one embodiment, the value N is an integer greater than 1. The controller 110 produces N control signals, each of which controls a respective one of the N switched-capacitor converters. Further embodiments herein include applying phase shifts of 360/N degrees to the N control signals controlling the N switched-capacitor converters.

More specifically, for an example embodiment of N=2, as previously discussed, switches in power supply 100 (where N=2) are divided into two switch groups: the first switch group including switches Q1, Q4, Q5 and Q8 (controlled by control signal 105-1), and a second switch group including switches Q2, Q3, Q6 and Q7, controlled by control signal 105-2, which is a (360/2) 180° phase shift of control signal 105-1.

Note that a further benefit of the interleaved switched-capacitor converter 130 as described herein is its symmetric behavior. For example, via the implementation of power supply 100: i) the interleaved switched-capacitor converter 130 is powered (or converts) almost continuously throughout a control cycle from the input power supply Vin, reducing the input current ripple as compared to other power supply technologies, ii) the controller 110 generates control signals 105 to uniquely switch coupling of each of the resonant circuit paths between two reference voltages (Vin and GND) to supply power to a respective load 118. As further discussed herein, this provides a natural balance regardless the tolerance of the respective circuit components.

Moreover, as previously discussed, and as further discussed in this disclosure, the additional inductor, Lzvs, provides the inductive energy to ensure ZVS transition for all field effect transistors in the switched-capacitor converter 150 such as during all switching conditions. For example, energy stored in the inductor Lzvs supplies charge to parasitic capacitors associated with respective switches 1-8.

Figure 3:
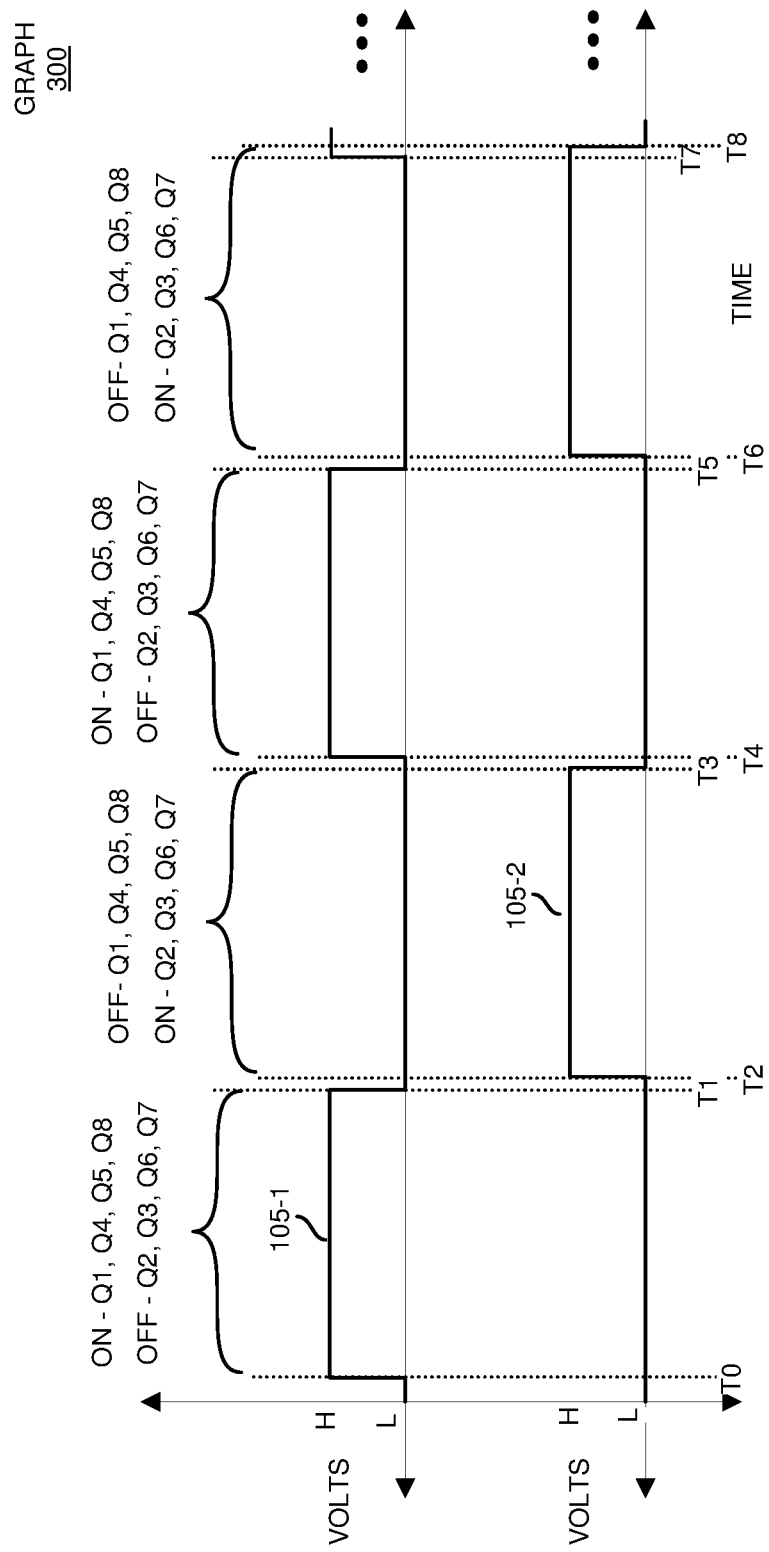
FIG. 3 is an example timing diagram illustrating signals that control switches in a switched-capacitor converter and a voltage converter according to embodiments herein.

FIG. 3 is an example diagram illustrating generation of controls signals to control a switched-capacitor converter and a respective voltage converter according to embodiments herein.

In general, as shown in graph 300 of FIG. 3, for an interleaved switched-capacitor converter 130 where N=2 (i.e., two interleaved switched-capacitor converters 131 and 132), the controller 110 generally produces the control signal 105-2 to be an inversion of control signal 150-1 other than during dead times (such as between T1 and T2, T3 and T4, etc.). A pulse width of each control signal is approximately 49% of a full period (control cycle) or other suitable pulse width modulation value.

More specifically, between time T0 and time T1, when the control signal 105-1 (at a logic high) controls the set of switches Q1, Q4, Q5, and Q8, to an ON state (low impedance or short circuit), the control signal 105-2 (logic low) controls the set of switches Q2, Q3, Q6, and Q7, to an OFF state (very high impedance or open circuit).

Conversely, between time T2 and time T3, when the control signal 105-2 (logic high) controls the set of switches Q2, Q3, Q6, and Q7, to an ON state, the control signal 105-1 (logic low) controls the set of switches Q1, Q4, Q5, and Q8, to an OFF state.

Thus, the controller 110 as described herein is operable to switch between activating the first switched-capacitor converter 131 and the second switched-capacitor converter 132 at different times during a switched-capacitor switching cycle such as between T0 and T4 to produce the output voltage 192.

Note again that the duration between T1 and time T2, duration time between time T3 and time T4, duration between T5 and T6, etc., represents so-called dead times during which each of the switches (Q1-Q8) in the interleaved switched-capacitor converter 130 (power supply 100) is deactivated to the OFF state (high impedance or open circuit).

As further shown, the control signals 105 are cyclical. For example, the settings of control signals 105 for subsequent cycles is the same as those for the cycle between time T0 and time T4. More specifically, the settings of control signals 105 produced by the controller 110 between time T4 and time T8 is the same as settings of control signals 105 between time T0 and time T4; and so on.

In one embodiment, the controller 110 controls the frequency of the control signals (period is time between T0 and time T4) to be any suitable frequency.

Additionally, as previously mentioned, the controller 110 controls the pulse duration of the control signals 105 to be around 49%, although the control signals 105 can be generated at any suitable pulse width modulation value.

Note that attributes of the switched-capacitor converter 120, such as settings of components, timing of control signals 105, etc., can be modified to convert any input voltage level to a respective desired (regulated or unregulated) output voltage level.

FIG. 4 is an example diagram illustrating a timing diagram of output signals according to embodiments herein.

As shown, graph 400 indicates status of signals associated with the interleaved switched-capacitor converter 300 according to embodiments herein.

In this example embodiment, as previously discussed, the voltage Vx indicates the voltage at node 281 of the interleaved switched-capacitor converter 130; voltage Vy indicates the voltage at node 282 of the interleaved switched-capacitor converter 130.

Izvs represents current through the inductor Lzvs.

Iin represents current supplied by the input voltage source (Vin) to the interleaved switched-capacitor converter 130.

Iout represents current outputted from the interleaved switched-capacitor converter 130.

Figure 5:
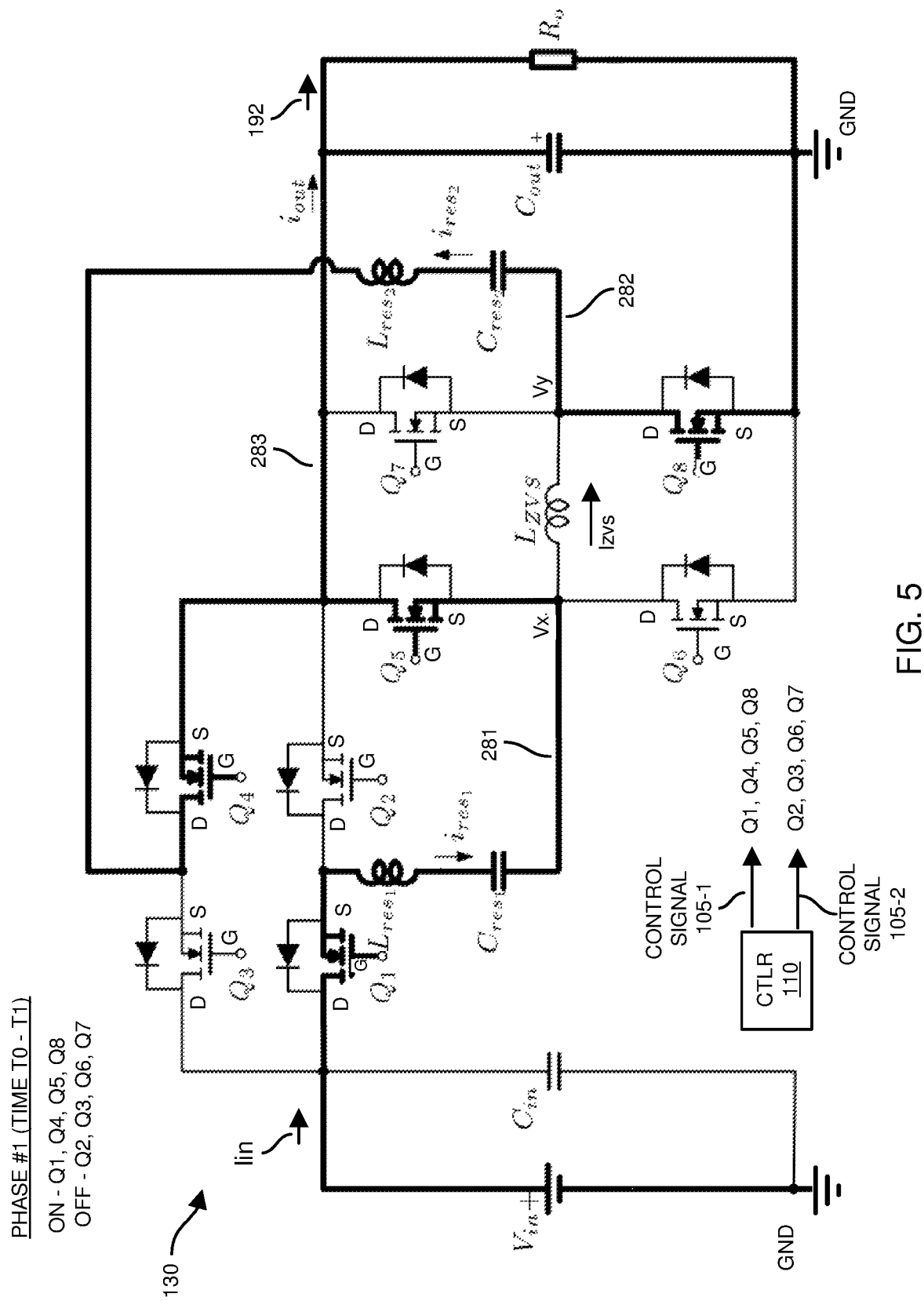
FIG. 5 is an example diagram illustrating a first mode of controlling switches in an interleaved switched-capacitor converter according to embodiments herein.

FIG. 5 is an example diagram illustrating a first mode (phase #1) of controlling switches in a switched-capacitor converter and voltage converter according to embodiments herein.

In phase #1, between time T0 and T1, as previously discussed, the controller 110 produces the control signal 105-1 to activate switches Q1, Q4, Q5, and Q8 to an ON state (low impedance between respective drain and source nodes of each switch); the controller 110 produces the control signal 105-2 to deactivate switches Q2, Q3, Q6, and Q7 to an OFF state (high impedance between respective drain and source nodes of each switch).

In this example embodiment, during phase #1 (between time T0 and T1), via activation of switch Q1 and switch Q5, the series combination of inductor Lres1 and capacitor Cres1 (e.g., resonant circuit path) in the switched-capacitor converter 131 is connected between the input voltage (Vin) and the node 283 (output node of interleaved switched-capacitor converter 130); via activation of the switch Q4 and switch Q8, the series combination of inductor Lres2 and capacitor Cres2 (e.g. resonant circuit path) in the switched-capacitor converter 132 is connected between the reference voltage GND and node 283.

Accordingly, in phase #1 (first mode), the controller 110 produces a first control signal 105-1 to uniquely control the switched-capacitor converter 131 and a second control signal 105-2 to control switched-capacitor converter 132.

FIG. 6 is an example diagram illustrating a dead time or deactivation of all switches in a switched-capacitor converter and voltage converter according to embodiments herein.

Between time T1 and T2, the controller 110 produces the control signal 105-1 to deactivate (turn OFF) switches Q1, Q4, Q5 and Q8; in such an instance, the parasitic capacitance of switches Q1, Q4, Q5 and Q8 are each charged; while the parasitic capacitance of Q2, Q3, Q6 and Q7 are each discharged to zero volts using the inductive energy stored in the inductor Lzvs (inductance at time T1). When the capacitance of switches Q1, Q4, Q5 and Q8 are discharged to zero, and after the dead time expires at time T2, the controller turns them ON to initiate the next switching cycle. The current Izvs at time T1 that enables ZVS operation, is denoted as iLzvs,pk in FIG. 4 which is determined by the following equation:

$$I_{L_{zvs,pk}} = \frac{V_{in}}{8 * L_{zvs} * f_{sw}}$$

Figure 7:
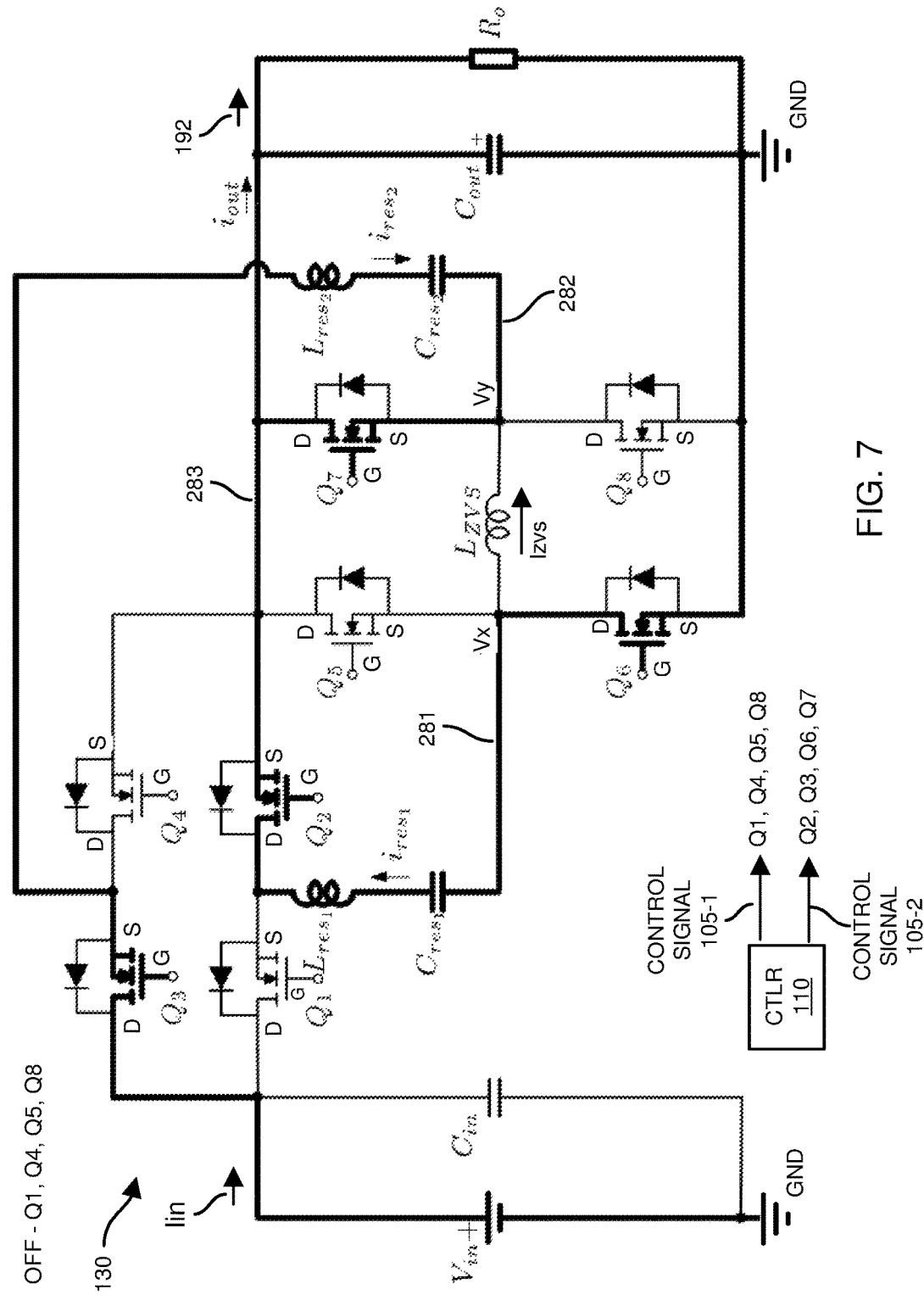
FIG. 7 is an example diagram illustrating a second mode of controlling switches in an interleaved switched-capacitor converter according to embodiments herein.

FIG. 7 is an example diagram illustrating a second mode of controlling switches in a switched-capacitor converter and voltage converter according to embodiments herein.

In phase #3, between time T2 and T3, as previously discussed, the controller 110 produces the control signal 105-1 to activate switches Q2, Q3, Q6, and Q7 to an ON state (low impedance between respective drain and source nodes of each switch); the controller 110 produces the control signal 105-2 to deactivate switches Q1, Q4, Q5, and Q8 to an OFF state (high impedance between respective drain and source nodes of each switch).

In this example embodiment, during phase #2 (between time T2 and T3), via activation of switch Q3 and switch Q7, the series combination of inductor Lres2 and capacitor Cres2 (e.g., resonant circuit path) in the switched-capacitor converter 132 is connected between the input voltage (Vin) and the node 283 (output node of interleaved switched-capacitor converter 130); via activation of the switch Q2 and switch Q6, the series combination of inductor Lres2 and capacitor Cres2 (e.g. resonant circuit path) in the switched-capacitor converter 131 is connected between the reference voltage GND and node 283.

Accordingly, in phase #3 (second mode), the controller 110 produces a first control signal 105-1 to control the switched-capacitor converter 131 and a second control signal 105-2 to control switched-capacitor converter 132.

Thus, as illustrated in a combination of FIGS. 5 and 7, the second control signal 105-2 is phase delayed with respect to the first control signal 105-1 such that, during phase #1, the series combination of inductor Lres1 and capacitor Cres1 of the first switched-capacitor converter 131 is coupled to a first reference voltage (such as Vin) via switch Q1 when the series combination of inductor Lres2 and capacitor Cres2) of the second switched-capacitor converter 132 is coupled to a second reference voltage (GND) via switch Q8. Conversely, during phase #3, the series combination of inductor Lres2 and capacitor Cres2 of the first switched-capacitor converter 132 is coupled to a first reference voltage (such as Vin) via switch Q3 when the series combination of inductor Lres1 and capacitor Cres1) of the first switched-capacitor converter 131 is coupled to a second reference voltage (GND) via switch Q6

Referring again to FIG. 4, as previously discussed, the advantage of activating the switches in this manner results in the rectified output, Iout. Output capacitor Cout helps to provide current during and around dead-times when the interleaved switched-capacitor converter 130 produces lower magnitude current. Thus, the output capacitor Cout serves to stabilize the output voltage 192.

FIG. 8 is an example diagram illustrating a dead time or deactivation of all switches in a switched-capacitor converter and voltage converter according to embodiments herein.

In a similar manner as previously discussed for operation in phase #2 in FIG. 6, the inductor Lzvs supports zero voltage switching to switches in the interleaved switched-capacitor converter 130 during phase #4.

Figure 9:
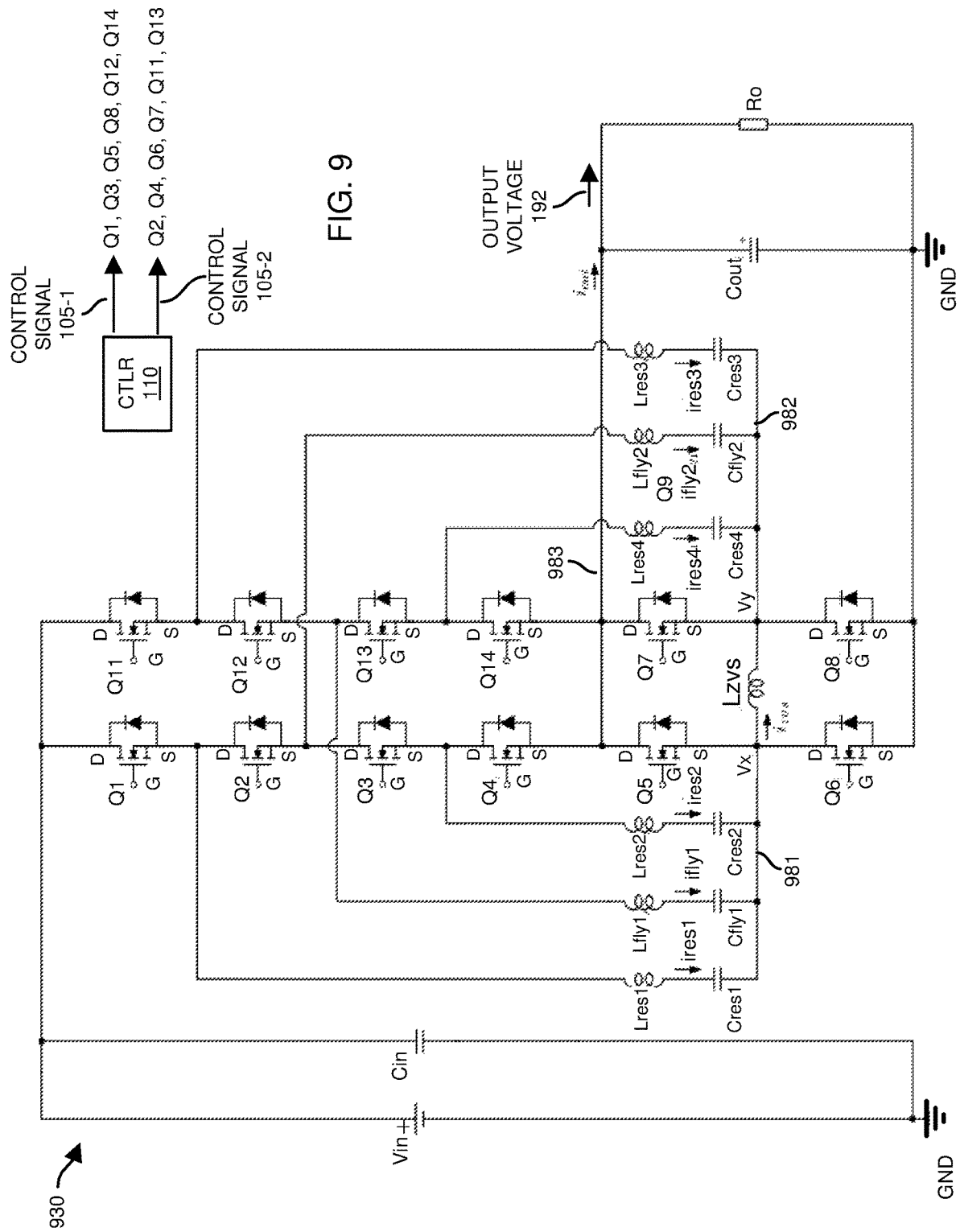
FIG. 9 is an example diagram illustrating implementation of an interleaved switched-capacitor converter according to embodiments herein.

FIG. 9 is an example diagram illustrating implementation of an interleaved switched-capacitor converter according to embodiments herein.

As previously discussed, an interleaved switched-capacitor converter can include any suitable number of switched-capacitor converters.

In this example embodiment, the interleaved switched-capacitor converter 930 is a 4:1 voltage down converter. For example, the interleaved switched-capacitor converter 930 converts an input voltage Vin to an output voltage having a magnitude of Vin/4.

More specifically, in this example embodiment, the first switched-capacitor converter 931 includes a first set of multiple resonant circuit paths such as a first resonant circuit path including Lres1 and Cres1 connected in series, a second resonant circuit path including inductor Lfly1 and capacitor Cfly1 connected in series, a third resonant circuit path including inductor Lres2 and Cres2 connected in series.

The second switched-capacitor converter 932 includes a first set of multiple resonant circuit paths such as a fourth resonant circuit path including Lres3 and Cres3 connected in series, a fifth resonant circuit path including inductor Lfly2 and capacitor Cfly2 connected in series, a sixth resonant circuit path including inductor Lres4 and Cres4 connected in series.

Via generation of the control signals 105-1 and 105-2, the controller 105 switches connectivity of the first set of multiple resonant circuit paths (such as Lres1/Cres1, Lres2/Cres2) and the second set of resonant circuit paths (such as Lres3/Cres3, Lres4/Cres4) to produce the output voltage 192. In one embodiment, Cfly1 is much greater in magnitude than Cres; Lres is greater in magnitude than Lfly. Thus, the components Lfly and Cfly do not contribute much to the resonance associated with a respective resonant tank circuit. The switching of a flying capacitor Cfly1 (acting as a respective intermediate voltage source less than a magnitude of Vin) and corresponding resonant circuit path (Lres/Cres) as well as Cfly2 (acting as a respective intermediate voltage source less than a magnitude of Vin) and corresponding resonant circuit path (Lres/Cres) as further discussed herein contributes to generation of the output voltage 192. In this example embodiment, the input voltage source supplies Vin to drain node (D) of switch Q1 and drain node (D) of switch Q11.

Source node (S) of switch Q1 is coupled to drain node (D) of switch Q2; source node (S) of switch Q11 is coupled to drain node (D) of switch Q12.

Source node (S) of switch Q2 is coupled to drain node (D) of switch Q3; source node (S) of switch Q12 is coupled to drain node (D) of switch Q13.

Source node (S) of switch Q3 is coupled to drain node (D) of switch Q4; source node (S) of switch Q13 is coupled to drain node (D) of switch Q14.

Source node (S) of switch Q4 is coupled to drain node (D) of switch Q5; source node (S) of switch Q14 is coupled to drain node (D) of switch Q7.

Source node (S) of switch Q5 is coupled to drain node (D) of switch Q6; source node (S) of switch Q7 is coupled to drain node (D) of switch Q8.

Source node (S) of switch Q6 is coupled to ground reference voltage; source node (S) of switch Q8 is coupled to ground reference.

Thus, in an alternating manner, via respective connections, resonant circuit path Les1/Cres1 is connected between the source node of switch Q1 and node 981; circuit path Lfly1/Cfly1 is connected between the source node of switch Q12 and node 981; resonant circuit path Lres2/Cres2 is connected between the source node of switch Q3 and node 981. Resonant circuit path Les3/Cres3 is connected between the source node of switch Q11 and node 982; circuit path Lfly2/Cfly2 is connected between the source node of switch Q2 and node 982; resonant circuit path Lres4/Cres4 is connected between the source node of switch Q13 and node 982.

Inductor Lzvs is connected between nodes 981 and node 982.

Further in this example embodiment, the controller 110 produces control signal 105-1 that drives respective gates and corresponding states of switches Q1, Q3, Q5, Q8, Q12, and Q14. Controller 110 produces control signal 105-2 that drives gates and corresponding states of switches Q2, Q4, Q6, Q7, Q11, and Q13.

In a similar manner as previously discussed, between time T0 and time T1, the control signal 105-1 (at a logic high) controls the set of switches Q1, Q3, Q5, Q8, Q12, and Q14, to an ON state (low impedance or short circuit); the control signal 105-2 (logic low) controls the set of switches Q2, Q4, Q6, Q7, Q11, and Q13, to an OFF state (very high impedance or open circuit).

Conversely, between time T2 and time T3, the control signal 105-1 (at a logic high) controls the set of switches Q2, Q4, Q6, Q7, Q11, and Q13, to an ON state (low impedance or short circuit); the control signal 105-2 (logic low) controls the set of switches Q1, Q3, Q5, Q8, Q12, and Q14, to an OFF state (very high impedance or open circuit).

The activation/deactivation of switches is further discussed below in FIGS. 10 and 11 below.

Figure 10:
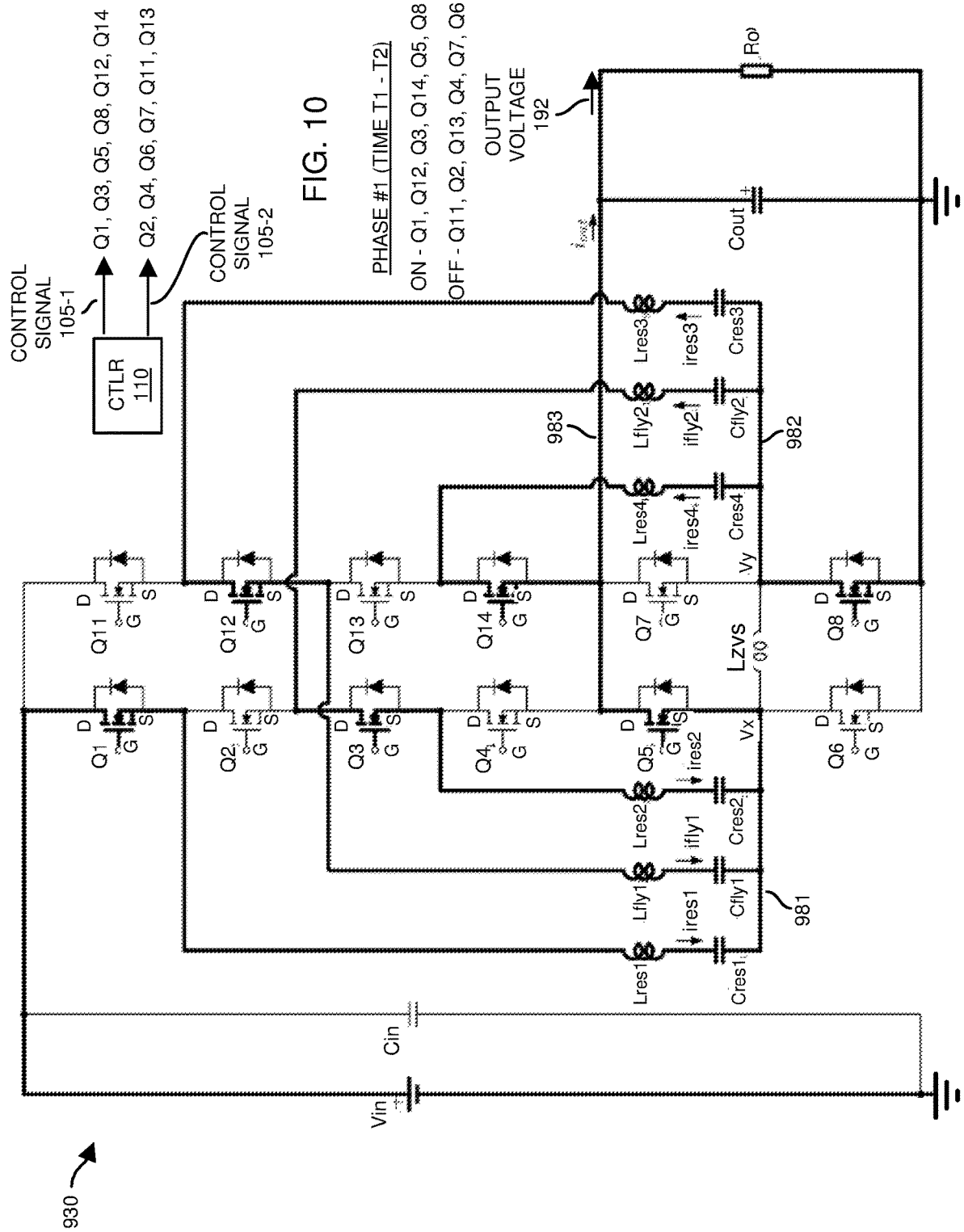
FIG. 10 is an example diagram illustrating a first mode of operating an interleaved switched-capacitor converter according to embodiments herein.

FIG. 10 is an example diagram illustrating a first mode of operating an interleaved switched-capacitor converter according to embodiments herein.

As shown in this example embodiment, the activation of switches Q1, Q3, Q5, Q8, Q12, and Q14 between T0 and T1 causes the switch Q1 to convey voltage Vin to the resonant circuit path Lres1/Cres. Activated switch Q5 conveys corresponding current Ires1 from the resonant circuit path to node 983.

Switch Q8 couples the node 282 to the ground reference voltage.

The activation of switch Q12 couples the resonant circuit path Lres3/Cres3 to circuit path Lfly1/Cfly1. In such an instance, series connection of the resonant circuit path Lres3/Cres3 and circuit path Lfly1/Cfly1 conveys respective current Ifly1 to node 981, which is coupled to node 983 via activated switch Q5. Thus, Ifly1 contributes to Iout. Note that, although in series with the resonant circuit path Lres3/Cres3, the fly path (Lfly1 and Cfly1) has little effect on the resonance of Lres3/Cres3 or other resonant circuit paths.

The activation of switch Q3 couples the resoncircuit path Lfly2/Cfly2 to resonant circuit path Lres2/Cres2. In such an instance, series connection of the resonresoncircuit path Lfly2/Cfly2 and resonant circuit path Lres2/Cres2 conveys corresponding current Ires2 to node 981, which is coupled to node 983 via activated switch Q5. Thus, Ires2 contributes to Iout.

The activation of switch Q14 couples the resonant circuit path Lres4/Cres4 to node 983. Thus, Ires4 contributes to Iout.

Thus, between time T0 and T1, the output current, iout, of the interleaved switched-capacitor converter 930 is ires1+ifly1+ires2+ires4. As previously discussed, the magnitude of the output voltage 192 is one fourth of Vin.

Figure 11:
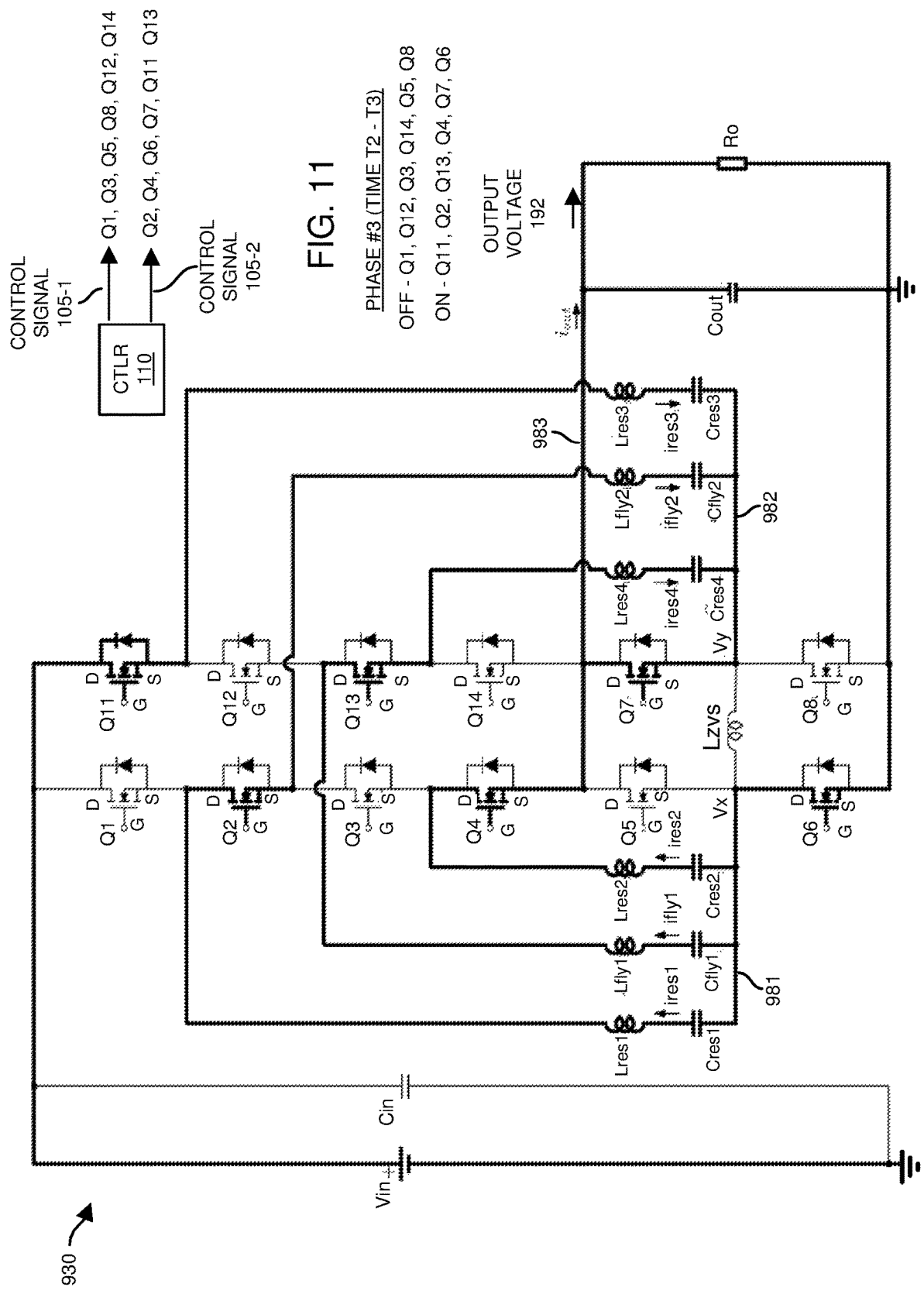
FIG. 11 is an example diagram illustrating a second mode of operating an interleaved switched-capacitor converter according to embodiments herein.

FIG. 11 is an example diagram illustrating a second mode of operating an interleaved switched-capacitor converter according to embodiments herein.

As shown in this example embodiment, the activation of switches Q2, Q4, Q6, Q7, Q11, and Q13 between T2 and T3 causes the switch Q11 to convey voltage Vin to the resonant circuit path Lres3/Cres3. Activated switch Q7 conveys corresponding current Ires3 to node 983.

Switch Q6 couples the node 281 to the ground reference voltage.

The activation of switch Q2 couples the resonant circuit path Lres1/Cres1 to circuit path Lfly2/Cfly2. In such an instance, series connection of the resonant circuit path Lres1/Cres1 and circuit path Lfly2/Cfly2 conveys respective current Ifly2 to node 982, which is coupled to node 983 via activated switch Q7. Thus, Ifly2 contributes to Iout. Note that, although in series with the resonant circuit path Lres1/Cres1, the fly path (Lfly1 and Cfly1) has little effect on the resonance of Lres1/Cres1 or other resonant circuit paths.

The activation of switch Q13 couples the circuit path Lfly1/Cfly1 to resonant circuit path Lres4/Cres4. In such an instance, series connection of the circuit path Lfly1/Cfly1 and resonant circuit path Lres4/Cres4 conveys corresponding current Ires4 to node 982, which is coupled to node 983 via activated switch Q7. Thus, Ires4 contributes to Iout. Thus, Ires4 contributes to Iout.

The activation of switch Q4 couples the resonant circuit path Lres2/Cres2 to node 983.

Thus, between time T2 and T3, the output current, iout, of the interleaved switched-capacitor converter 930 is ires3+ifly2+ires4+ires2. As previously discussed, the magnitude of the output voltage 192 is one fourth of Vin.

In a similar manner as previously discussed, inductor Lzvs provides zero voltage switching of switches in the respective interleaved switched-capacitor converter 930 during a dead time of phase #2 (such as between time TT1 and T2) and phase #4 (such as between time T3 and T4), when all switches Q1-Q8 and Q11-Q14 are deactivated.

Functionality supported by the different resources will now be discussed via flowchart in FIG. 12. Note that the steps in the flowcharts below can be executed in any suitable order.

Figure 12:
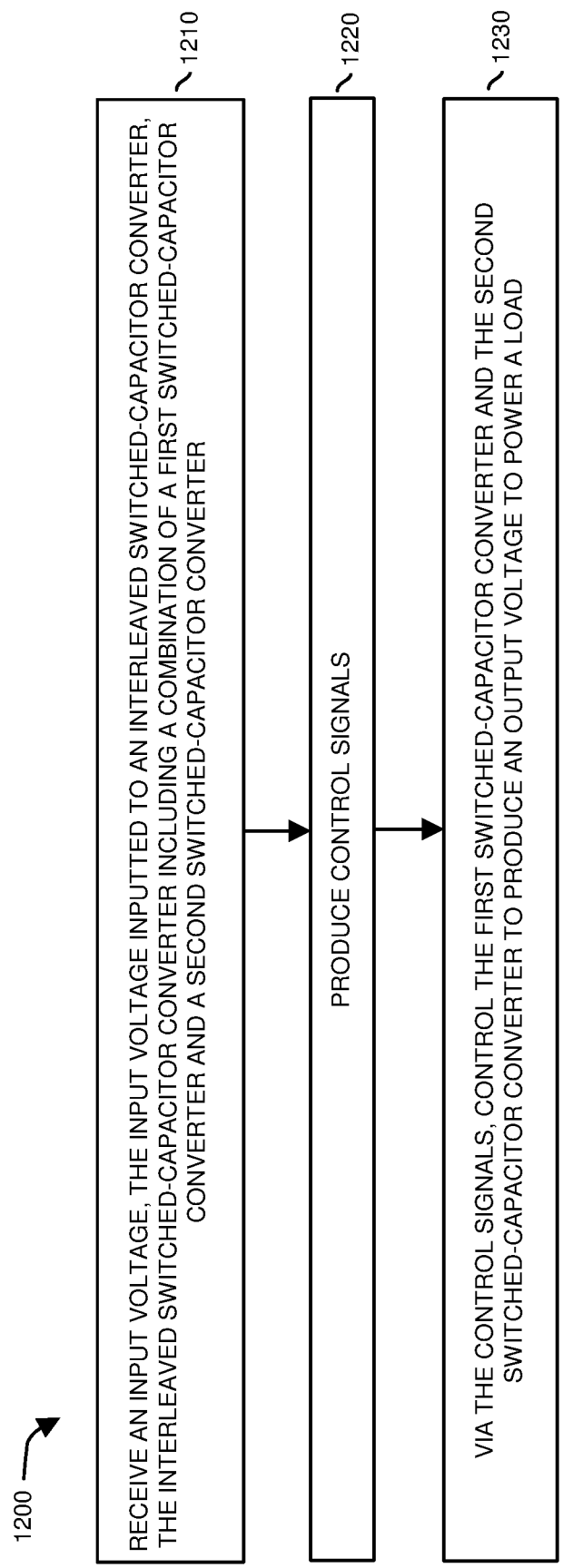
FIG. 12 is an example diagram illustrating a general method according to embodiments herein.

FIG. 12 is a flowchart 1200 illustrating an example method according to embodiments herein. Note that there will be some overlap with respect to concepts as discussed above.

In processing operation 1210, the interleaved switched-capacitor converter 130 receives an input voltage (Vin). The interleaved switched-capacitor converter 130 includes a combination of a first switched-capacitor converter 131 and a second switched-capacitor converter 132.

In processing operation 1220, the controller 110 produces control signals 105.

In processing operation 1230, in accordance with the control signals 105, the interleaved switched-capacitor converter 120 controls the first switched-capacitor converter 121 and the second switched-capacitor converter 122 to produce an output voltage 192 to power the load 118 (Ro).

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a first switched-capacitor converter;
   a second switched-capacitor converter, the first switched-capacitor converter interleaved with the second switched-capacitor converter;
   an inductor, the inductor coupling the first switched-capacitor converter to the second switched-capacitor converter; a controller that produces control signals, the control signals controlling the first switched-capacitor converter and the second switched-capacitor converter, the interleaved first switched-capacitor converter and the second switched-capacitor converter being an interleaved switched-capacitor converter configured to produce an output voltage that powers a load;
   and wherein the inductor is configured to provide zero voltage switching to first switches in the interleaved switched-capacitor converter and second switches in the interleaved switched-capacitor converter.

2. The apparatus as in claim 1, wherein the controller switches between coupling of a first resonant circuit path and coupling of a second resonant circuit path of the interleaved switched-capacitor converter at different times to an input voltage source during a switched-capacitor switching cycle to produce the output voltage, the interleaved switched-capacitor converter configured to convert the input voltage into the output voltage.

3. The apparatus as in claim 2, wherein the first resonant circuit path is disposed in the first switched-capacitor converter; and
   wherein the second resonant circuit path is disposed in the second switched-capacitor converter.

4. The apparatus as in claim 3, wherein the controller is configured to produce a first control signal and a second control signal in which the first control signal controls activation of the first switched-capacitor converter and the second control signal controls activation of the second switched-capacitor converter; and
   wherein the second control signal is phase delayed with respect to the first control signal such that: i) the first switched-capacitor converter is coupled to the input voltage when the second switched-capacitor converter is coupled to a ground reference voltage, and ii) the second switched-capacitor converter is coupled to the input voltage when the first switched-capacitor converter is coupled to the ground reference voltage.

5. The apparatus as in claim 1, wherein the controller switches between activating the first switched-capacitor converter and the second switched-capacitor converter at different times during a switched-capacitor switching cycle to produce the output voltage.

6. The apparatus as in claim 1 further comprising:
a first resonant circuit path, the first resonant circuit path disposed in the first switched-capacitor converter; and
a second resonant circuit path, the second resonant circuit path disposed in the second switched-capacitor converter.

7. The apparatus as in claim 6, wherein a resonant frequency of the first resonant circuit path is substantially similar to a resonant frequency of the second resonant circuit path.

8. The apparatus as in claim 1, wherein the interleaved first switched-capacitor converter and the second switched-capacitor converter convert an input voltage into the output voltage at a ratio of x:1, in which x=Vin/Vout, where Vin=a magnitude of the input voltage and Vout=a magnitude of the output voltage; and
wherein x is an integer value greater than 1.

9. The apparatus as in claim 1, wherein the first switched-capacitor converter includes a first set of resonant circuit paths;
wherein the second switched-capacitor converter includes a second set of resonant circuit paths; and
wherein the controller is configured to switch between activating the first set of multiple resonant circuit paths and the second set of resonant circuit paths to produce the output voltage.

10. The apparatus as in claim 1, wherein a resonant circuit path in the first switched-capacitor converter is coupled to a first flying capacitor, switching of the resonant circuit path of the first switched-capacitor converter contributing to generation of the output voltage; and
wherein a resonant circuit path in the second switched-capacitor converter is coupled to a second flying capacitor, switching of the resonant circuit path of the second switched-capacitor converter contributing to generation of the output voltage.

11. The apparatus as in claim 1 further comprising:
a number, N, of switched-capacitor converters including the first switched-capacitor converter and the second switched-capacitor converter, where N is an integer greater than 1; and
wherein the controller is configured to produce N control signals, each of which controls a respective one of the N switched-capacitor converters.

12. The apparatus as in claim 11, wherein each of the N control signals is phase shifted by 360/N degrees.

13. The apparatus as in claim 1 further comprising:
multiple switches; and
wherein the controller is configured to control states of the multiple switches to provide switched connectivity of the first switched-capacitor converter and the second switched-capacitor converter to an input voltage source.

14. The method as in claim 1, wherein the first switches are disposed in the first switched-capacitor converter, wherein the second switched are disposed in the second switched-capacitor converter, and wherein the inductor is configured to supply charge to parasitic capacitors associated with the multiples switches.

15. The apparatus as in claim 1, wherein a magnitude of current through the inductor peaks during a condition in which first switches in the first switched-capacitor converter and second switches in the second switched-capacitor converter are simultaneously deactivated to an OFF state.

16. The method as in claim 1, wherein the inductor is configured to charge respective parasitic capacitance of the first switches and discharge parasitic capacitance of the second switches.

17. The apparatus as in claim 1 further comprising:
a first flying capacitor, the first flying capacitor disposed in the first switched-capacitor converter, the first flying capacitor contributing to generation of the output voltage; and
a second flying capacitor disposed in the first switched-capacitor converter, the second flying capacitor contributing to generation of the output voltage.

18. The apparatus as in claim 17, wherein the first flying capacitor resides in a resonant circuit path of the first switched-capacitor converter;
wherein the second flying capacitor resides in a resonant circuit path of the first switched-capacitor converter.

19. The apparatus as in claim 1 further comprising:
a first switch coupled to a first node of the inductor;
a second switch coupled to a second node of the inductor; and
wherein the controller is configured to switch between activating the first switch and the second switch during generation of the output voltage.

20. The apparatus as in claim 19, wherein activation of the first switch connects the first node of the inductor to a ground reference voltage; and wherein activation of the second switch connects the second node of the inductor to the ground reference voltage.

21. An apparatus comprising:
a first switched-capacitor converter;
a second switched-capacitor converter, the first switched-capacitor converter interleaved with the second switched-capacitor converter; and
a controller to produce control signals, the control signals controlling the first switched-capacitor converter and the second switched-capacitor converter, the interleaved first switched-capacitor converter and the second switched-capacitor converter configured to produce an output voltage that powers a load;
a first resonant circuit path, the first resonant circuit path disposed in the first switched-capacitor converter;
a second resonant circuit path, the second resonant circuit path disposed in the second switched-capacitor converter; and
an inductor electrically coupling the first resonant circuit path and the second resonant circuit path, the inductor configured to provide zero voltage switching to first switches in the first switched-capacitor converter and second switches in the second switched-capacitor converter.

22. A method comprising: receiving an input voltage, the input voltage inputted to an interleaved switched-capacitor converter including a first switched-capacitor converter and a second switched-capacitor converter, an inductor coupling the first switched-capacitor converter to the second switched-capacitor converter; producing control signals; via the control signals, controlling the first switched-capacitor converter and the second switched-capacitor converter to produce an output voltage to power a load;
wherein the first switched-capacitor converter includes a first resonant circuit path;
wherein the second switched-capacitor converter includes a second resonant circuit path; and the method further comprising:
electrically coupling the first resonant circuit path and the second resonant circuit path to the inductor, the electrical coupling to the inductor providing zero voltage switching to first switches in the first switched-capacitor converter and second switches in the second switched-capacitor converter.

23. The method as in claim 22, wherein controlling the interleaved switched-capacitor converter includes:
switching between activating the first switched-capacitor converter and the second switched-capacitor converter during each of multiple switching cycles to produce the output voltage.

24. The method as in claim 23, wherein controlling the interleaved switched-capacitor converter includes:
producing a first control signal and a second control signal in which the first control signal controls activation of the first switched-capacitor converter and the second control signal controls activation of the second switched-capacitor converter; and
delaying the second control signal with respect to the first control signal such that: i) the first switched-capacitor converter is coupled to the input voltage when the second switched-capacitor converter is coupled to a ground reference, and ii) the second switched-capacitor converter is coupled to the input voltage when the first switched-capacitor converter is coupled to the ground reference voltage.

25. The method as in claim 22 further comprising:
providing zero voltage switching to first switches in the first switched-capacitor converter and second switches in the second switched-capacitor converter.

26. The method as in claim 22, wherein controlling the interleaved first switched-capacitor converter and the second switched-capacitor converter includes; controlling the first resonant circuit path and the second resonant circuit path at a substantially similar resonant frequency.

27. The method as in claim 22 further comprising:
controlling the interleaved first switched-capacitor converter to convert the input voltage into the output voltage at a ratio of x:1, in which x=Vin/Vout, where Vin=a magnitude of the input voltage and Vout=a magnitude of the output voltage; and
wherein x is an integer multiple of 2.

28. The method as in claim 22, wherein the first switched-capacitor converter includes a first set of resonant circuit paths;
wherein the second switched-capacitor converter includes a second set of resonant circuit paths, the method further comprising:
switching between activating the first set of resonant circuit paths and the second set of resonant circuit paths to produce the output voltage.

29. The method as in claim 22 further comprising:
switching a first resonant circuit path in the interleaved switched-capacitor converter, the first resonant circuit path coupled to a first flying capacitor, switching of the first resonant circuit path contributing to generation of the output voltage; and
switching a second resonant circuit path in the interleaved switched-capacitor converter, the second resonant circuit path coupled to a second flying capacitor, switching of the second resonant circuit path contributing to generation of the output voltage.

30. The method as in claim 22, wherein the interleaved switched-capacitor converter includes, N, switched-capacitor converters including the first switched-capacitor converter and the second switched-capacitor converter, N being an integer greater than 1, the method further comprising:
producing N control signals, each of which controls a respective one of the N switched-capacitor converters.

31. The method as in claim 30 further comprising:
applying phase shifts of 360/N degrees to the N control signals controlling the N switched-capacitor converters.

* * * * *

UNITED STATES PATENT AND TRADEMARK OFFICE
CERTIFICATE OF CORRECTION

Page 1 of 1

PATENT NO. : 10,651,731 B1
APPLICATION NO. : 16/263479
DATED : May 12, 2020
INVENTOR(S) : Christian Rainer and Matthew A. Hunter It is certified that error appears in the above-identified patent and that said Letters Patent is hereby corrected as shown below:

In the Claims

Claim 14, Column 15:
Line 57, delete "method", insert --apparatus--
Line 59, delete "switched", insert --switches--
Line 62, delete "multiples", insert --multiple--

Claim 16, Column 16:
Line 1, delete "method", insert --apparatus--
Line 2, delete "capacitance", insert --capacitances--
Line 3, delete "capacitance", insert --capacitances--

Signed and Sealed this
Twenty-eighth Day of July, 2020

Andrei Iancu
*Director of the United States Patent and Trademark Office*